(No Model.) 2 Sheets—Sheet 1.
J. VOGT.
GRAIN CONVEYER.
No. 508,788. Patented Nov. 14, 1893.
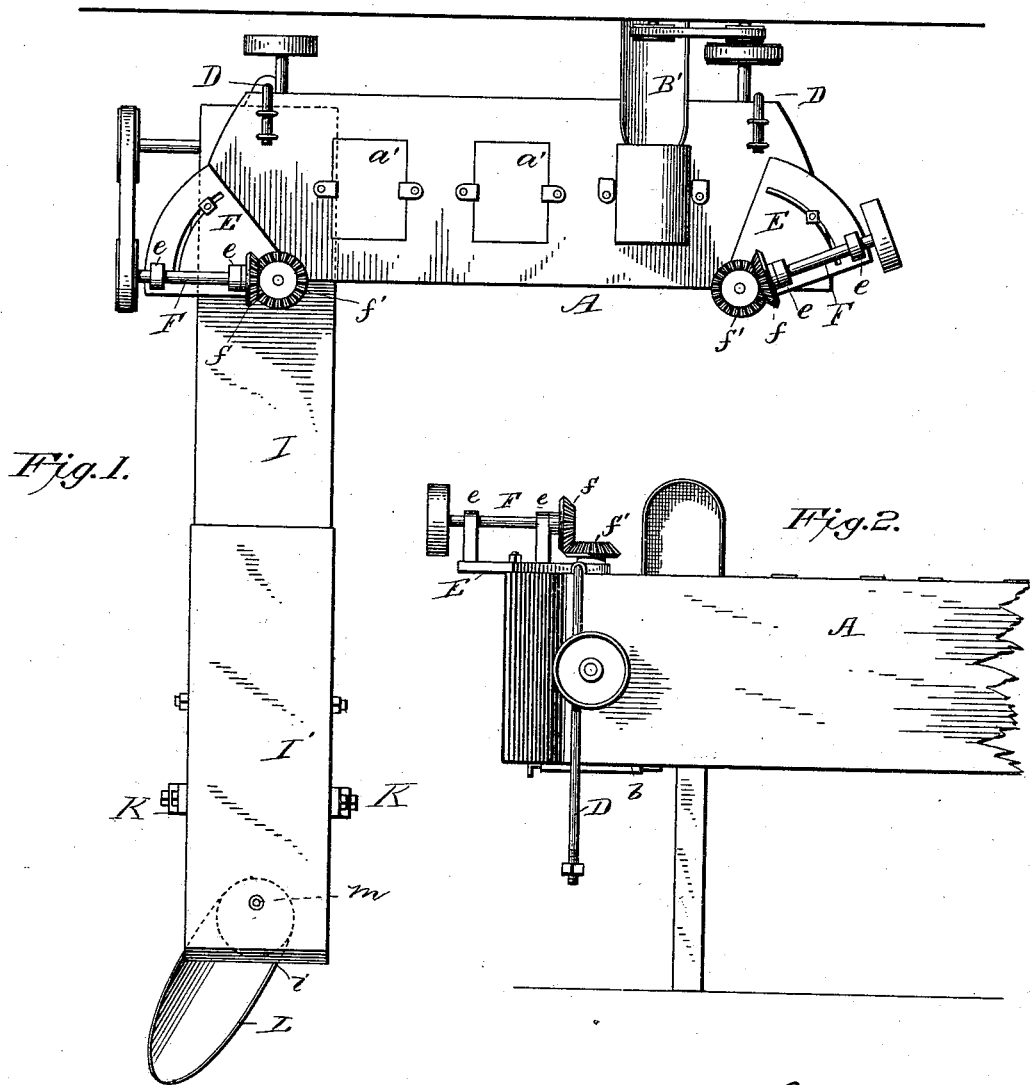

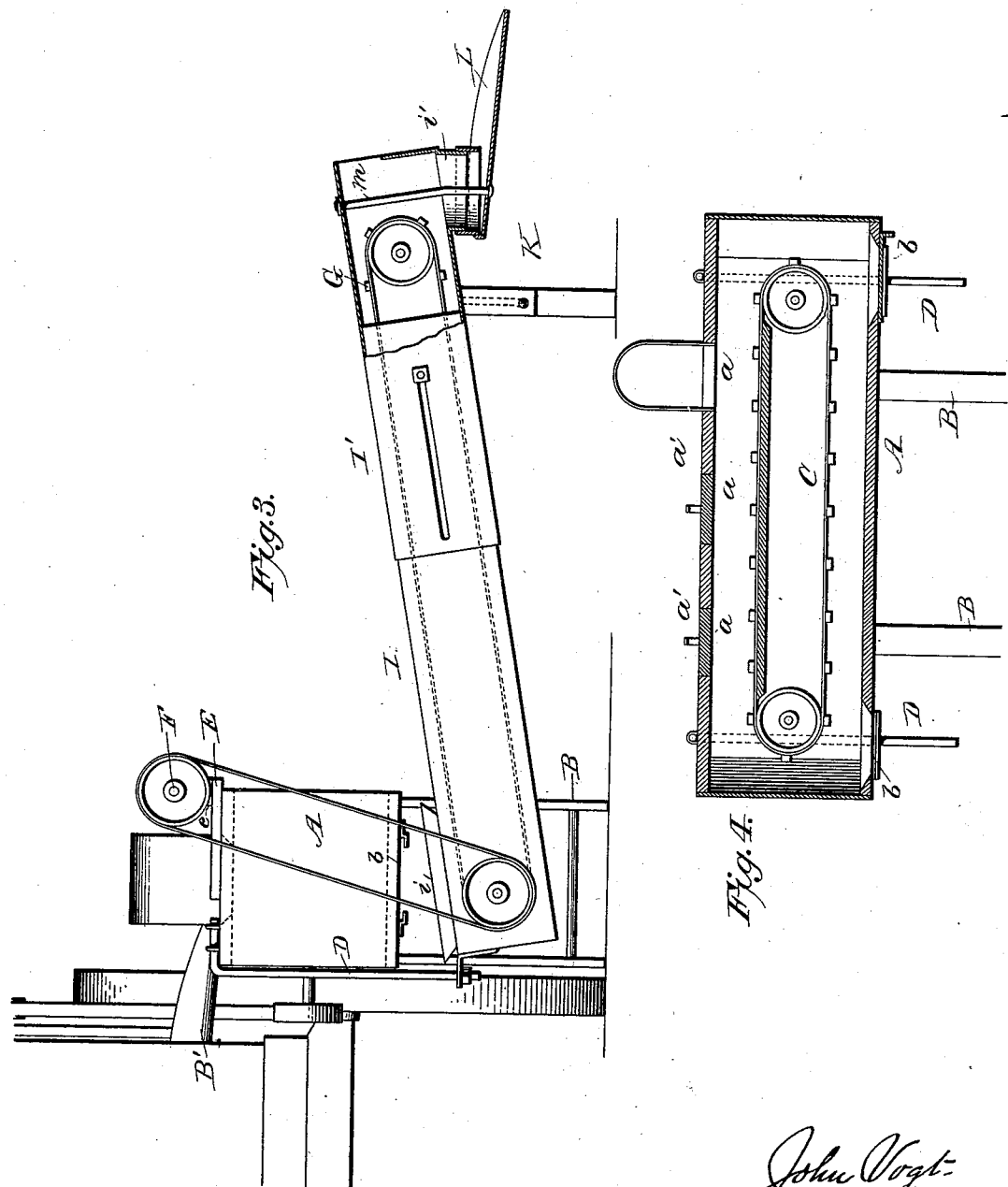

UNITED STATES PATENT OFFICE.

JOHN VOGT, OF WINESBURG, OHIO.

GRAIN-CONVEYER.

SPECIFICATION forming part of Letters Patent No. 508,788, dated November 14, 1893.

Application filed August 3, 1893. Serial No. 482,227. (No model.)

*To all whom it may concern:*

Be it known that I, JOHN VOGT, a citizen of the United States of America, residing at Winesburg, in the county of Holmes and State of Ohio, have invented certain new and useful Improvements in Grain-Conveyers; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of the invention is to provide means for taking the grain from a thrashing machine and conveying the same to a suitable receptacle, as a granary or storage bin; and the invention comprises a conveyer made up of three sections, two of which are extensible one on the other, the nonextensible section having a series of openings into which may lead the discharge spout of the thrashing-machine.

In the accompanying drawings, forming part of this specification, Figure 1 is a plan view of a grain conveyer constructed in accordance with my invention. Fig. 2 is a side elevation of an end of one of the sections. Fig. 3 is a side view, and Fig. 4 is a longitudinal sectional view of the non-extensible section.

A designates the non-extensible or main section of the grain conveyer, which consists of a suitable box or housing which is supported upon legs B, the upper part or top of the housing being provided with three or more openings $a\ a$ provided with covers $a'$, the grain being fed from the thrashing-machine into the section A through said openings. Only one of the openings is used at a time but a plurality are provided in order to accommodate the position of the thrashing-machine. The opening into which the discharge spout B' of the thrashing-machine may lead is preferably provided with a hood which is removably secured to the section A. The bottom of the box or housing is provided at each end with a discharge opening $b$ and centrally with an endless conveyer-belt C, the grain being fed upon the conveyer-belt and deposited therefrom through one of the openings $b$. The shafts of the conveyer-belt pass through one side of the section A and are provided with pulleys which are driven by the rotary mechanism of the thrashing-machine.

The section A is provided with depending rods D which are preferably threaded at their lower ends and provided with nuts so that they may be used for connecting the extensible sections to said section A under one of the discharge openings $b$. On the opposite side of the section A from the rods D are located segmental plates E which are pivoted to the top of the box or housing and are each provided with a slot through which passes a bolt upon which is placed a clamping-nut for rigidly securing the segmental plates in adjusted positions. These segmental plates are each provided with upwardly projecting bearings $e\ e$ through which passes a shaft F having at one end a pulley and at the other a gearwheel $f$ which meshes with a gearwheel $f'$ on the end of a shaft journaled in bearings attached to one side of the section A, the other end of said shaft having a gearwheel which meshes with a gearwheel on the end of the shaft over which the endless conveyer-belt C passes. By means of this construction the conveyer-belt of the extensible sections will be driven indirectly from the thrashing-machine and at the same rate of speed as the belt C.

I and I' designate the extensible sections, which are adapted to telescope one upon the other so that the outer section may be extended according to the elevation it is desired to convey the grain, and these extensible sections are provided with shafts over which passes the conveyer-belt, G, said conveyer-belt being made up of several sections so that it may be lengthened or shortened. The inner end of the section I is provided with a bracket having an aperture through which one of the threaded rods D is adapted to pass so that the opening $i$ in the section will be located under one of the discharge openings $b$ of the section A, and the outer end of the section I is provided with bolts which pass through slots in the sides of the section I' so that when said section is adjusted it may be rigidly secured. The section I' is provided with supporting legs K which are extensible so that the desired elevation can be given to the sections I and I'. The discharge opening i' at the outer end of the section I' is provided with a spout L which is pivoted to the section by means of a rod m so that said spout can be swung to discharge in any direction.

By means of the grain conveyer herein shown and described the grain can be conveyed from a thrashing-machine directly into a storage bin or granary, and the parts are so constructed that the device can be readily applied.

Having thus described my invention, what I claim is—

In a grain conveyer, the combination, of a housing or box containing an endless belt having a number of inlet openings in its top and an outlet opening near each end, a segmental plate pivoted upon the housing or box and adapted to be secured in an adjusted position, a shaft journaled on said segmental plate and having a gearwheel which meshes with a gearwheel mounted on a shaft driven from one of the shafts of the endless belt, together with extensible sections I and I' attached to the housing or box beneath one of the outlet openings therein and inclosing a conveyer belt driven from the shaft journaled on the segmental plate, substantially as shown and for the purpose set forth.

In testimony whereof I affix my signature in presence of two witnesses.

JOHN VOGT.

Witnesses:
G. J. HOFFMAN,
HENRY G. VOGT.